April 16, 1935.   T. B. TIEFENBACHER   1,997,758
DRILL POINT GAUGE
Filed July 27, 1933
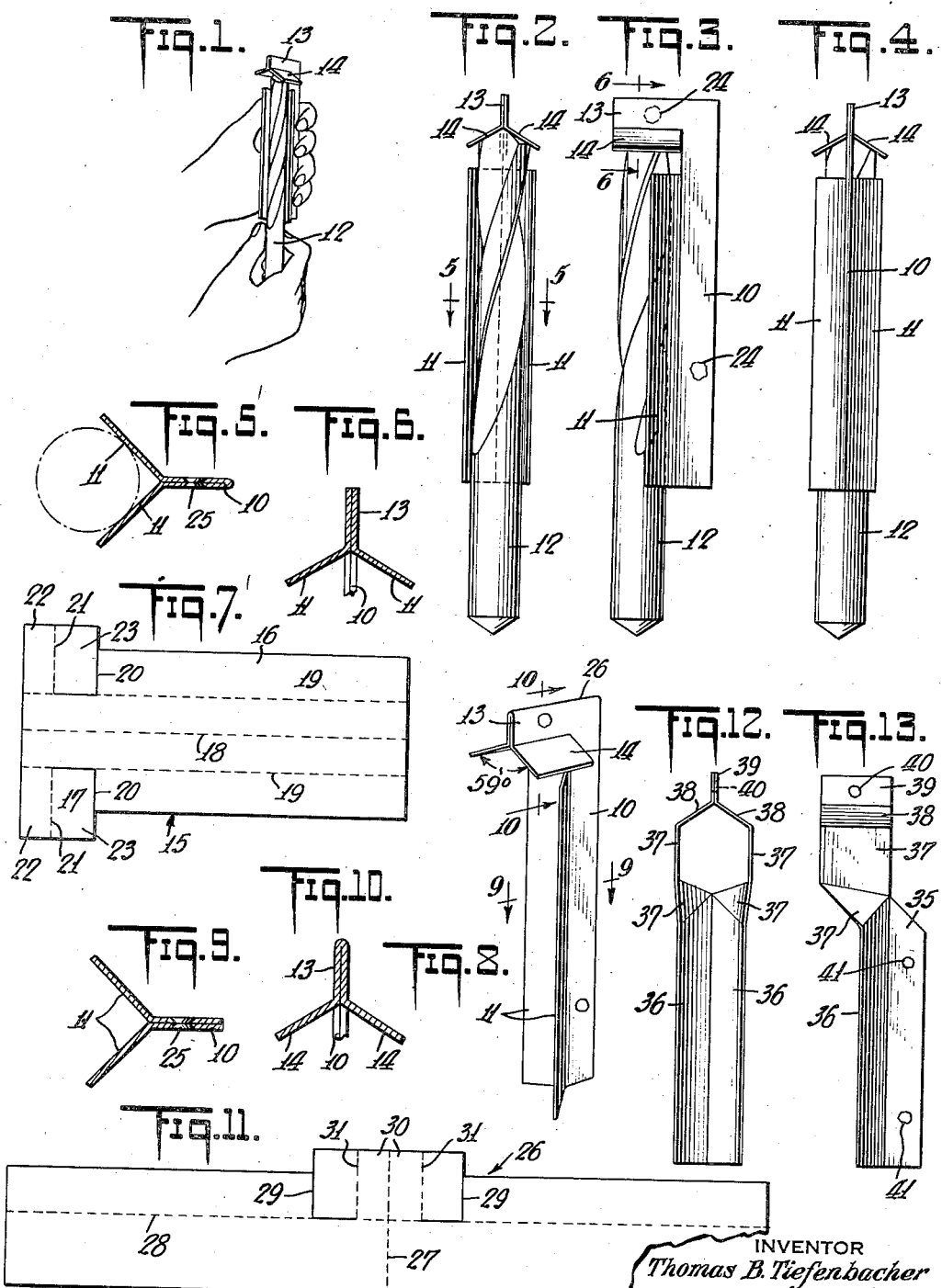

Patented Apr. 16, 1935

1,997,758

UNITED STATES PATENT OFFICE 1,997,758

DRILL POINT GAUGE

Thomas B. Tiefenbacher, Paterson, N. J.

Application July 27, 1933, Serial No. 682,442

5 Claims. (Cl. 33—201)

My present invention relates to improvements in drill point gauges and particularly to a snap gauge which will enable a machinist to instantly determine whether or not the angle or bevel of the point of the twist drill is accurate.

An object of the invention is to provide a drill gauge which requires the exercise of no skill in properly aligning the drill with the gauging surface, the gauge including means which automatically centers the axis of the drill at right angles to the point gauging surface.

Another object is to provide a convenient pocket tool of this character which is of simple, practical, rugged, durable construction, well suited to meet the requirements of economic manufacture, careless handling and convenient use.

Another more specific object is to provide a gauge which may be conveniently formed from a single piece of metal, the metal merely being stamped and bent into the proper shape to afford a channel receiving the drill and gauge surface at the end of the channel against which the drill point abuts.

Another object is to provide a gauge tool of this type which will permit the drill point to be inspected from diametrically opposite sides while it is held in the gauge.

The invention may be more fully understood from the following description in connection with the accompanying drawing wherein:—

Fig. 1 is a perspective view illustrating the manner of use of my improved gauge tool, Fig. 2 is a plan view of the tool showing a drill being gauged therein, Fig. 3 is a side elevational view of the drill and gauge shown in Fig. 2, Fig. 4 is a rear elevational view of the drill and gauge shown in Fig. 2, Fig. 5 is an enlarged transverse sectional view on the line 5—5 of Fig. 2 showing the drill in dotted lines, Fig. 6 is an enlarged longitudinal sectional detail on the line 6—6 of Fig. 3, Fig. 7 is a plan view of the blank used in forming the gauge of Figs. 1 to 6, Fig. 8 is a perspective view of a slightly modified type of gauge tool, Fig. 9 is an enlarged transverse sectional view on the line 9—9 of Fig. 8, Fig. 10 is an enlarged longitudinal sectional view on the line 10—10 of Fig. 8, Fig. 11 is a broken plan view of the blank from which the gauge of Fig. 8 is formed, Fig. 12 is a top plan view of a further modified form of gauge tool and Fig. 13 is a side elevational view of the device shown in Fig. 12.

This application is a continuation in part of my copending application Serial No. 550,870, filed July 15, 1931.

Referring first to Figs. 1 to 7 of the drawing, my improved gauge tool includes an elongated flat beam portion 10, formed of a double thickness of metal and with the two metal laminations flaring apart at one edge of the beam to define a V-shaped channel 11 for the reception of a drill 12. The channel 11 terminates short of the end of the beam and beyond the channel, the beam is of increased width as indicated at 13 and a pair of gauging wings 14 may be bent outwardly from the two metal laminations forming the beam. These two wings face the end of the channel defining a generally V-shaped abutment plate against which the point of the drill is adapted to abut. It is well known that the most efficient angle or bevel for drill points is 59° and the gauging wings or abutment plate 14 therefore cooperatively define an angle of 59°. Thus when a drill point has been placed in the channel and its point shoved home against the abutment plate, a ready visual indication may be had as to whether or not the angle or bevel of the drill point is correct, or whether the point needs to be reground.

It is worthy of note that when grasping the beam 10 which constitutes the handle of the device, the wings of the channel 11 protect the fingers of the user from casual injury by the drill point or the drill, also since the channel 11 terminates short of the abutment plates 14 the channel will in no way impair the vision of an observer when viewing the drill from the back of the tool as seen in Fig. 4.

Referring now to the blank indicated generally at 15 in Fig. 7, it will be observed that this blank includes a main rectangular body portion 16 and a transverse, narrow rectangular portion 17 disposed across one end of the body 16 integrally connected thereto and extending laterally therebeyond. 18 indicates the central folding line of the blank which extends the full length of portion 16 and transverse of the portion 17. Two fold lines 19—19 spaced laterally from the fold line 18 also extend the full length of the portion 16 and the full width of the portion 17. Portions 16 and 17 are partially divided from each other by slits 20 extending inwardly along the abutting edges of such portions and terminating at the fold lines 19. Other fold lines 21 extend longitudinally of the portion 17 and terminate at the fold lines 19. The manner of folding is as follows:—The blank is first folded along the line 18, those portions of the blank between the lines 18 and 19 constituting the two laminations of the beam, and the portions 22 of the blank constituting the upward end extension 13 of the beam.

The edges of the portion 16 of the blank are now folded outwardly on the lines 19 to define the channel 11 and the portions 23 of the blank are folded outwardly on the lines 21 to define the two abutment plates or wings 14. With the tool thus completely folded from a single blank and with the two laminations of the beam integrally connected along their edge, means may be employed if desired to prevent any relative separation of the beam forming members 10 and 13. Such means as indicated in Fig. 3 may take the form of spot welds 24 or as shown in Figs. 5 and 9, may comprise headless rivets 25.

The welding or riveting is intended to lend rigidity to the structure where the tool is made of comparatively thin gauge stock.

The gauge illustrated in Figs. 8 to 11 inclusive is identical in construction with the gauge of Figs. 1 to 7 inclusive except for the fact that it is formed from a different type of blank and the two laminations which constitute the beam are integrally connected along the edge 26 of the enlarged beam end 13 instead of being integrally connected along the longitudinal edge of the beam.

The blank from which the tool of Figs. 8 to 10 inclusive is formed, is shown in Fig. 11. This narrow elongated blank designated generally at 26 has a central transverse fold line 27 and a longitudinally extending fold line 28 which runs the full length of the blank. Integrally connected to the blank along the line 28 but otherwise separated from the blank by slits 29 is a blank portion 30 extending laterally beyond one edge of the main body of the blank. Fold line 27 extends centrally through the extension 30 and between this fold line and the two slits 29 there are arranged fold lines 31 parallel to the line 27 and extending from the outer edge of the blank portion 30 to the fold line 28. In folding this tool the first folding operation is on the line 27 bringing the two identical edges of the blank together. The next folding operation is on the line 28 to define the channel forming wings. The final folding operation is outwardly on the line 31 to form the two wings of the abutment plate. Riveting or spot welding may be resorted to to hold the two laminations of the beam securely together.

It should be understood that while I have discussed the blanks as having fold lines in them, such fold lines are not necessarily present. Such lines need not be actually formed in the blank but they are useful in the present drawing for showing the manner in which the blanks of Figs. 7 and 11 may be folded to form the gauge tools of Figs. 1 and 8.

In Figs. 12 and 13 I have illustrated a further modification of the gauge tool, the principal advantage of which is the fact that the beam cannot interfere with proper observation of the drill point being gauged. This gauge includes a beam 35 corresponding to the beam 10 and a pair of channel forming flanges 36 cooperating to define a drill receiving channel, corresponding to the channel 11. The beam 35 however terminates at the end of the channel and a pair of arms 37 disposed in planes parallel to the plane of the beam extend forwardly from the channel forming members 36 and are integrally connected thereto as by the triangular extensions 37 of the members 36. Arms 37 are then bent angularly inwardly toward each other as at 38 until they meet and the ends of the arms lie in lateral juxtaposition at 39. In this instance the portions 38 constitute the gauging and abutment means, the portions 39 may be riveted together as at 40 and the beam may be riveted as at 41. When a drill is laid in the channel 36—36 and its point thrust against the surface 38—38 it may be observed from either the front or the back, without the beam or any other portion of the tool interfering with the clarity of the vision of one inspecting the drill point. It will be noted from Fig. 4 that when the drill is observed from the back of the tool, the extreme tip of the drill is concealed by the beam 10.

It will thus be seen that there is herein described a device in which the several features of this invention are embodied, and which device in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:—

1. A snap gauge for drill points stamped and bent from a single piece of metal and including a flat beam portion formed of a double thickness of metal and having an end portion considerably wider than the remainder of the beam, a pair of diverging flanges cooperatively defining a V-shaped channel extending longitudinally of said beam portion to center a drill and bent in opposite directions from the two metal laminations constituting the main body of the beam, the wider end of the beam having its laminations bent outwardly along lines at right angles to the longitudinal axis of the beam to present a V-shaped drill point gauging plate at right angles to the channel and against which the point of a drill in the channel is adapted to abut.

2. A gauge as set forth in claim 1 and wherein the double beam forming laminations are spot welded together.

3. A gauge as set forth in claim 1 and wherein headless rivets lying flush with opposite surfaces of the beam hold the laminations of the beam against relative separation.

4. A drill point gauge including an elongated flat handle member, integral wings flaring in opposite directions from one edge of the handle member and defining a channel adapted to receive and center a drill, an integral lateral extension at one end of the handle beyond the channel and a pair of integral wings flaring outwardly from the edge of such extension, nearest the channel and defining a V-shaped gauge against which the point of a drill in said channel is adapted to abut, said gauge being stamped, bent and formed from a single piece of metal with the handle and extension both consisting of two laminations of said metal.

5. A snap gauge for drill points stamped and bent from a single piece of metal and including a flat beam portion formed of a double thickness of metal, a pair of diverging flanges cooperatively defining a V-shaped channel extending longitudinally of said beam portion to center a drill and bent in opposite directions from the two metal laminations constituting the main body of the beam, a V-shaped drill point gauging plate at right angles to and beyond the end of the channel and against which the point of a drill in the channel is adapted to abut, said gauging plate being integrally connected to the beam.

THOMAS B. TIEFENBACHER.